United States Patent [19]
Behrens

[11] Patent Number: 5,974,735
[45] Date of Patent: Nov. 2, 1999

[54] SODDING ELEMENT AND METHOD OF PRODUCING SODDING

[76] Inventor: Wolfgang Behrens, Trespenmoor 25, D-27243 Gross Ippener, Germany

[21] Appl. No.: 08/967,168

[22] Filed: Nov. 10, 1997

[30] Foreign Application Priority Data

Nov. 21, 1996 [DE] Germany ............................ 196 48 106

[51] Int. Cl.⁶ ...................................................... A01B 79/00
[52] U.S. Cl. ..................................... 47/58.1; 47/59; 47/66
[58] Field of Search ................................... 47/58.1, 59, 66

[56] References Cited

U.S. PATENT DOCUMENTS

| | | |
|---|---|---|
| 4,318,248 | 3/1982 | Muldner . |
| 4,941,282 | 7/1990 | Milstein . |
| 5,390,442 | 2/1995 | Behrens . |
| 5,608,989 | 3/1997 | Behrens . |
| 5,724,766 | 3/1998 | Behrens . |

FOREIGN PATENT DOCUMENTS

| | | |
|---|---|---|
| 0337085 | 10/1989 | European Pat. Off. . |
| 2438301 | 2/1976 | Germany . |
| 3805069 | 9/1989 | Germany . |
| 4219275 | 12/1993 | Germany . |
| WO 97/01687 | 1/1997 | WIPO . |

*Primary Examiner*—Leon B. Lankford, Jr.
*Attorney, Agent, or Firm*—Burns, Doane, Swecker & Mathis, L.L.P.

[57] ABSTRACT

A sodding element for sodding sod bodies consisting of natural soil and/or substrate surfaces is described. The sodding element comprises a seed mat, which has seeds that are distributed uniformly at separate locations and are secured and held in place by the seed mat. In addition to the seeds, the seed mat laid on the sod body also contains a dry adhesive so that the seed mat is bonded to the sod body under the influence of water.

13 Claims, 1 Drawing Sheet

SODDING ELEMENT AND METHOD OF PRODUCING SODDING

BACKGROUND OF THE INVENTION

In producing sodding for sod bodies with grass or other plants, the seeds for the respective plants must be sown and applied to the sod body. Then the desired sodding can be produced, and optionally some horticultural care may be required.

Sod bodies in landscaping are preferably embankments or noise protection walls containing natural soil. Sodding provides stability and erosion protection due to the rooting of the plants in the soil.

Furthermore, sodding also presents an attractive appearance from a visual standpoint.

In addition, the sod body may also be made of substrate surfaces or components of vegetation mats for sodding artificial surfaces, in particular for sodding roofs. Seeds must also be applied here to produce the desired sodding.

In practice, the seeds are usually applied by a person sowing the seeds by hand. It has been found that the seeds are often unevenly distributed on the sod body, and there are areas with too many seeds and other areas with very few seeds or even empty spaces without any seeds. This uneven distribution of seeds results in uneven sodding, which is a disadvantage. This has a negative effect on the desired erosion protection on embankments, for example, because the empty spaces are very susceptible and there is the danger of soil erosion due to external influences, especially the effects of wind.

In addition, uneven sodding is also unattractive from a visual standpoint.

When the person sowing the seeds by hand observes that the application has not been uniform, that person will automatically attempt to fill up the empty spaces or the sparsely seeded areas subsequently by sowing more seeds. However, the result is that far more seeds are needed on the whole than would have been necessary for a given area of the sod body. This has the disadvantage of increasing the cost of producing sod.

Moreover, it is observed in practice that the seeds sown do not always remain completely on the sod body because they are exposed to external influences. Especially in high winds, there is the danger of individual seeds being blown away. This also results in uneven sodding with the disadvantages described above.

Against this background, the object of this invention is to eliminate the existing disadvantages by creating a sodding element that can be used to produce sodding on a sod body made of natural soil and/or substrate surfaces, especially at a low cost for producing the sodding.

SUMMARY OF THE INVENTION

It has been found that an improved water-permeable sodding element for use in providing plants in a uniform distribution on a substrate comprises substantially parallel upper and lower layers of a porous flexible biodegradable material and seeds disposed at spaced locations between the layers together with a dry biocompatible water-activatable adhesive whereby the adhesive when contacted with water is capable of penetrating the lower layer of the sodding element to form an adhesive bond between the sodding element and a substrate where plants are desired so as to hold the sodding element in place at least until the seeds form plants having roots which extend into the substrate.

It has been found that a method for providing growing plants in a uniform distribution on a substrate where growing plants are desired comprises:

(a) positioning on a substrate where growing plants are desired a water-permeable sodding element comprising substantially parallel upper and lower layers of a porous flexible biodegradable material and seeds disposed at spaced locations between the layers together with a dry biocompatible water-activatable adhesive whereby the adhesive when contacted with water is capable of penetrating the sodding element, and (b) applying water to the sodding element whereby the water-activatable adhesive penetrates said lower layer of said sodding element and causes the sodding element to adhere to the substrate at least until the seeds form plants having roots which extend into the substrate.

DESCRIPTION OF PREFERRED EMBODIMENTS

Figure 1:
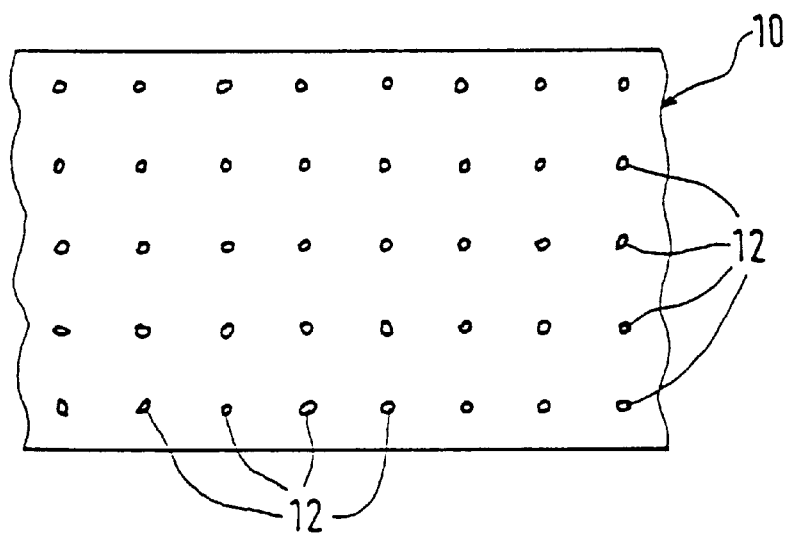
FIG. 1 is a top view of a sodding element in accordance with the invention.

In this invention, the sodding element is formed in a novel manner by a seed mat made of a flexible, biodegradable material which already contains seeds arranged at separate locations, where they are secured and held in place by the seed mat. Another important feature of this invention consists of the fact that the seed mat is provided at least partially with a plant-compatible dry adhesive by which the seed mat is bonded to the sod body under the influence of water at least until it is sufficiently rooted to the sod body due to the plants growing from the seeds.

The invention is based on two basic ideas. First, a seed mat containing the required seeds in the required amount secured uniformly at separate locations is used and is laid on the sod body. This ensures a uniform growth of the plants. The known method of sowing seeds by hand is thus replaced by the application of the seed mat which can be laid on a sod body over a large area. Experiments have shown that consumption of seeds can be reduced by more than 50% because of the uniform distribution of seeds provided by the seed mat, which leads to a cost advantage.

Furthermore, it is of crucial importance that the seed mat is provided in a novel manner with a plant-compatible dry adhesive which permits bonding of the seed mat to the sod body under the influence of water. This bonding in the sense of fortification ensures that the seed mat will remain on the sod body even when exposed to high winds, because the seed mat forms an adhesive bond with the sod body. The amount of adhesive is preferably metered so that the adhesive bond is guaranteed at least until adequate rooting of the plants in the sod body is achieved. Then erosion protection is provided by the roots of the plants themselves.

In an advantageous embodiment of the invention, the seed mat consists of a bottom layer and a top layer attached to it, with the seeds secured between them and with the dry adhesive distributed uniformly between them. The bottom layer and the top layer may be made of a nonwoven.

Another embodiment of the invention provides for the seed mat to comprise a bottom nonwoven carrier on which are arranged the seeds and the dry adhesive, and the nonwoven carrier is sprayed with a plant-compatible adhesive. The top layer of the seed mat may also be formed by an adhesive layer of a plant-compatible adhesive.

In an expedient manner, the seed mat is designed to be especially porous in the area below the dry adhesive and/or the bottom layer of the seed mat. Thus, the dry adhesive can easily penetrate through the bottom part of the seed mat when water is added to produce an adhesive bond to the sod body.

According to another embodiment of this invention, the seed mat consists of a bottom layer and a top layer attached to it, with the seeds secured between them, and the dry adhesive is provided on the bottom surface of the bottom layer of the seed mat. The dry adhesive can thus be bonded to the bottom layer. This arrangement has the advantage that when water is added, the dry adhesive comes in direct contact with the sod body and can establish the desired adhesive bond between the seed mat and the sod body.

The object of this invention is also to create a process for producing sod on a sod body formed by natural soil and/or substrate surfaces so that it can be carried out economically and avoid the disadvantages of uneven sodding.

Here again, the seed mat is of primary concern; it is laid on the sod body and it already contains seeds that are secured and held in place by the seed mat. The seed mat also contains a plant-compatible dry adhesive.

This seed mat is laid on the sod body and then the seed mat is watered to activate the dry adhesive, so the seed mat is bonded to the sod body.

To produce sodding on sod bodies covering an especially large area, the invention provides in an advantageous embodiment for laying several sheets of seed mats side by side on the sod body to form a complete surface. This invention will now be explained in greater detail below on the basis of the embodiment illustrated in the figures.

Figure 2:
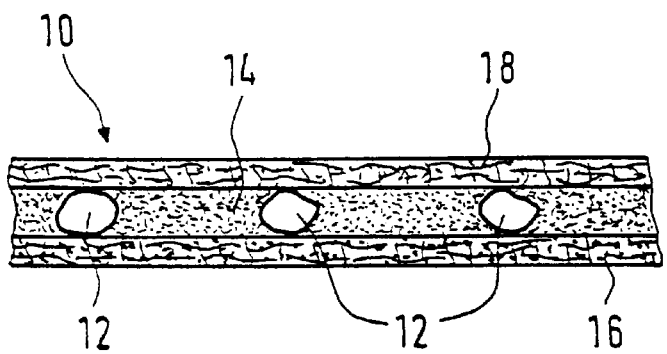
FIG. 2 is a cross-sectional view of the sodding element in accordance with the present invention that is shown in FIG. 1.

FIG. 1 shows a top view of a section of a sodding element in the form of a seed mat 10. As this shows, seed mat 10 contains seeds 12 that are distributed evenly at separate locations and are secured and held in place by seed mat 10. Details of the structure of seed mat 10 are shown in the cross-sectional view according to FIG. 2. Seed mat 10 comprises a bottom layer 16 and a top layer 18 attached to it. Between them are the seeds 12, and a plant-compatible dry adhesive 14 is also arranged between the two layers 16, 18. Bottom layer 16 and top layer 18 may be made of a flexible and biodegradable nonwoven. Bottom layer 16 is especially porous, so that dry adhesive 14 can penetrate well and rapidly through bottom layer 16 when water is added to produce the adhesive bond with the substrate. Seed mat 10 can contain fertilizer uniformly distributed therein together with seeds 12.

Figure 3:
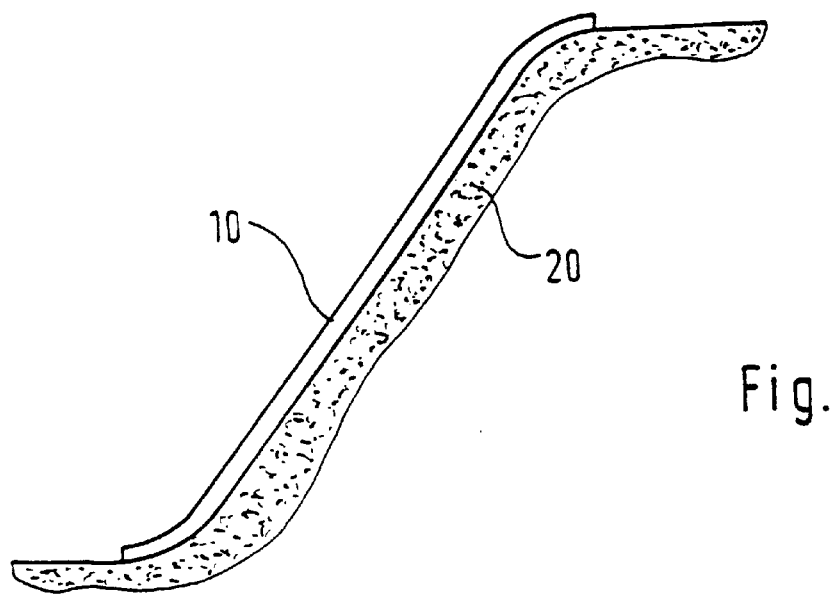
FIG. 3 is a side view of a sodding element in accordance with the present invention while secured to an embankment to form a sod body following the activation of the dry biocompatible water-activatable adhesive of the sodding element.

FIG. 3 shows a cross-sectional view of an embankment 20 with natural soil as the sod body. Seed mat 10 is laid on embankment 20 to produce the sodding. If long and large areas are involved, multiple seed mats 10 may be laid side by side to form a complete covering. Since the seed mat is made of a flexible material, it conforms to any irregularities in the embankment.

Dry adhesive 16 of seed mat 10 is activated by adding water, producing an adhesive bond to the surface of embankment 20. As a result, seed mat 10 is thus secured on the embankment and protected from the effects of wind. At the same time, plants begin to grow from seeds 12 with their roots extending into the embankment.

The amount of dry adhesive 14 is metered so that the adhesive bond to the embankment persists at least until the roots of the plants have grown to a sufficient extent, because then it is no longer necessary for seed mat 10 to be bonded to embankment 20. In addition, the seed mat is made of a biodegradable material, so it practically dissolves spontaneously after a certain period of time, when the sodding has become established.

Thus, in this invention, the previous application of seed is replaced by laying a seed mat and securing it on a sod body with the help of a dry adhesive.

On the basis of FIG. 3, sodding of an embankment 20, i.e., a sod body of natural soil, is described. However, this invention can also be applied when the sod body is a substrate or a vegetation carrier in roof sodding.

I claim:

1. A water-permeable sodding element for use in providing plants in a uniform distribution on a substrate where growing plants are desired, said sodding element comprising substantially parallel upper and lower layers of a porous flexible biodegradable material and seeds disposed at spaced locations between said layers together with a dry biocompatible water-activatable adhesive whereby said adhesive when contacted with water is capable of penetrating said lower layer of said sodding element to form an adhesive bond between said sodding element and a substrate where plants are desired so as to hold said sodding element in place at least until said seeds form plants having roots which extend into said substrate.

2. A water-permeable sodding element according to claim 1 wherein said upper and lower layers of said sodding element are formed of porous flexible nonwoven fibrous material.

3. A water-permeable sodding element according to claim 1 wherein said lower layer of said sodding element is a porous flexible nonwoven fibrous material on which had been disposed said seeds and said dry biocompatible water-activatable adhesive followed by spraying with a plant-compatible adhesive.

4. A water-permeable sodding element according to claim 1 wherein said lower layer is a porous flexible nonwoven fibrous material and said upper layer was formed by the spray application of a plant-compatible adhesive.

5. A water-permeable sodding element according to claim 1 wherein said seeds are secured between said layers by an adhesive bond.

6. A water-permeable sodding element according to claim 1 wherein a fertilizer is present with said seeds and said dry biocompatible water-activatable adhesive between said layers.

7. A method for providing growing plants in a uniform distribution on a substrate where growing plants are desired comprising:
   (a) positioning on a substrate where growing plants are desired a water-permeable sodding element comprising substantially parallel upper and lower layers of a porous flexible biodegradable material and seeds disposed at spaced locations between said layers together with a dry biocompatible water-activatable adhesive whereby said adhesive when contacted with water is capable of penetrating said sodding element, and
   (b) applying water to said sodding element whereby said water-activatable adhesive penetrates said lower layer of said sodding element and causes said sodding element to adhere to said substrate at least until said seeds form plants having roots which extend into said substrate.

8. A method for providing growing plants in a uniform distribution on a substrate according to claim 7 wherein said upper and lower layers of said sodding element are formed of a porous flexible nonwoven fibrous material.

9. A method for providing growing plants in a uniform distribution on a substrate according to claim 7 wherein said lower layer of said sodding element is a porous flexible nonwoven fibrous material on which had been disposed said seeds and said dry biocompatible water-activatable adhesive followed by spraying with a plant-compatible adhesive.

10. A method for providing growing plants in a uniform distribution on a substrate according to claim 7 wherein said upper layer of said sodding element was formed by the spray application of a plant-compatible adhesive.

11. A method for providing growing plants in a uniform distribution on a substrate according to claim 7 wherein said seeds are secured between said layers of said sodding element of step (a) by an adhesive bond.

12. A method for providing growing plants in a uniform distribution on a substrate according to claim 7 wherein a fertilizer is present with said seeds and said dry biocompatible water-activatable adhesive between said layers.

13. A method for providing plants in a uniform distribution on a substrate according to claim 7 wherein multiple sodding elements are laid side by side on said substrate so as to completely cover the surface of said substrate.

\* \* \* \* \*